(12) United States Patent
Yee

(10) Patent No.: US 7,134,805 B2
(45) Date of Patent: Nov. 14, 2006

(54) PRECAST CONCRETE SLAB SYSTEM AND METHOD THEREFOR

(75) Inventor: Alfred A. Yee, Honolulu, HI (US)

(73) Assignee: Kwik Slab, LLC, Honolulu, HI (US)

( * ) Notice: Subject to any disclaimer, the term of this patent is extended or adjusted under 35 U.S.C. 154(b) by 17 days.

(21) Appl. No.: 10/814,583

(22) Filed: Apr. 1, 2004

(65) Prior Publication Data

US 2005/0220539 A1 Oct. 6, 2005

(51) Int. Cl.
*E01C 11/04* (2006.01)
(52) U.S. Cl. .............................. 404/50; 404/56; 404/62; 52/586.2; 52/592.1; 403/381
(58) Field of Classification Search ................ 404/47, 404/50, 51, 56, 62, 63, 40; 52/259, 586.2, 52/592.1; 403/292, 355, 375, 381
See application file for complete search history.

(56) References Cited

U.S. PATENT DOCUMENTS

| 1,237,542 | A | * | 8/1917 | Morgal ........................ 404/40 |
| 1,991,931 | A | | 2/1935 | Kling et al. |
| 4,145,153 | A | * | 3/1979 | Fasullo et al. ................. 404/73 |
| 4,362,426 | A | | 12/1982 | Ruckstuhl |
| 4,619,096 | A | * | 10/1986 | Lancelot, III ................ 52/726.1 |
| 5,230,191 | A | * | 7/1993 | Mayrand .................. 52/309.12 |
| 5,548,938 | A | * | 8/1996 | Scheiwiller ..................... 52/604 |
| 5,626,289 | A | | 5/1997 | Demers et al. |
| 5,682,635 | A | | 11/1997 | Tolliver et al. |
| 6,058,672 | A | * | 5/2000 | McClellan .................. 52/587.1 |
| 6,571,452 | B1 | * | 6/2003 | Wang ........................... 29/557 |
| 6,607,329 | B1 | | 8/2003 | Smith |
| 6,622,442 | B1 | * | 9/2003 | Kwon ........................... 52/259 |
| 6,659,677 | B1 | * | 12/2003 | Exposito ...................... 403/24 |
| 6,663,315 | B1 | | 12/2003 | Smith |
| 6,802,168 | B1 | * | 10/2004 | Minnick ...................... 52/592.1 |
| 6,952,905 | B1 | * | 10/2005 | Nickel et al. .................. 52/711 |
| 2002/0170259 | A1 | | 11/2002 | Ferris |

FOREIGN PATENT DOCUMENTS

EP 0 098 099 * 1/1984

OTHER PUBLICATIONS

"Super-Slab", The Fort Miller Co., Inc. (date unknown).

* cited by examiner

*Primary Examiner*—Gary S. Hartmann
(74) *Attorney, Agent, or Firm*—Jacobson Holman PLLC

(57) ABSTRACT

A pre-fabricated concrete slab system and method have matching rectangular male and female type slabs which fit adjacent to each other in a checkerboard fashion. The male slabs include spaced reinforcing rods extending longitudinally and transversely through the male slabs with the rods' distal ends protruding outwardly away from one or more side edges of the male slabs to form a plurality of male connectors. The female slabs include a plurality of corresponding female sockets on one or more sides of the female slab, each female socket receiving a corresponding male connector when dropped therein. Corresponding female sockets positioned on opposite side edges of the female slabs are interconnected by steel reinforcing bars in both the longitudinal and transverse directions in a configuration similar to the male slabs so that, when connected, a continuous tension reinforcement is established between male and female slabs in both the longitudinal and transverse directions.

24 Claims, 13 Drawing Sheets

PRECAST CONCRETE SLAB SYSTEM AND METHOD THEREFOR

FIELD OF INVENTION

The present invention relates generally to pre-fabricated concrete slabs or other forms that can be rapidly connected and used for repairs on highway pavements, roadways and parking lots, bridge decks, aircraft runways, taxiways, buildings, floors, roofs, or any structure made using precast concrete forms. More specifically, the present invention is directed to an interlocking system that allows the precast slabs or forms to be quickly and easily set tightly joined together, while maintaining continuous tension reinforcement in two dimensions and with a minimum of grouting and alignment.

INTRODUCTION

Concrete structures are known to wear, deteriorate, settle and crack over time with continuous use as well as to exposure to traffic, weather and extremes of temperature. A good example of this type of structure is a concrete roadway. One of the faster methods of repairing concrete roadways is through the use of precast concrete slabs. The damaged area of pavement is excavated and cleared and the subgrade is prepared. The concrete slabs are then positioned over the damaged area and dropped into place. It is well known that such concrete slabs can be created so that they are interconnectable. Examples of such art can be found in U.S. Pat. Nos. 1,991,931, 4,362,426, 5,626,289, 5,682,635, 6,607,329 and U.S. patent application Ser. No. 2002/0170259.

One of the problems with the prior art concrete slabs is the inability of the slabs to provide for tension in two dimensions. For example, in the Kling et al. U.S. Pat. No. (1,991,931) the slabs have interlocking tabs but they do not provide for continuous tensile forces between the precast panels, nor do they provide sufficient shear resistance between panels. The Ruckstuhl U.S. Pat. No. (4,362,426), on the other hand, does appear to provide tension in two dimensions. However, the Ruckstuhl structure lacks simplicity. The connection hardware consists of a plate and screws which are inset into the precast slab, and the system uses highly precisioned complex metal parts that allow little tolerance and are impractical in the field.

A similar problem is found with the structure of the Tolliver et al. U.S. Pat. No. (5,682,635). The nature of the Tolliver connection requires perfect precision, as the screw threads in the form will not be executable unless the positioning and alignment of the male and female parts are exactly true. This must be the case for every single connecting bolt, and in concrete construction in the field, this is practically impossible. Even if a user were to manage to line up one bolt and execute the connection, the next connection must also be lined up perfectly in order that the screw threads can be threaded. From a practical use standpoint, this is not ordinarily possible on a real road situation, certainly not one that seeks repair in a matter of hours. The structure of the Smith patent (U.S. Pat. No. 6,607,327) does evidence some tensile strength in two dimensions, however, it is relatively weak and does not realize the benefit of using continuous tensile steel to anchor the connectors in two dimensions.

As such, there is a need in the industry for precast concrete slabs which may be laid down so that traffic can resume in the damaged area in a matter or hours. The slabs must be strong, have satisfactory strength in two dimensions and be able to be leveled and grouted with cement mortar.

Furthermore, there is also a need in the industry to be able to construct buildings and other structures using precast connecting forms that allow for full tension in two dimensions between connecting concrete parts providing tension in two dimensions and with the added strength of steel reinforcing bars throughout the length of the form, and with a minimal amount of grouting and alignment.

SUMMARY OF THE INVENTION

The present invention comprises a plurality of male type prefabricated concrete slabs and female type prefabricated concrete slabs which can be quickly and easily fitted to each other in a checkerboard fashion for repair to roadways, airplane runways and other applications where concrete slabs can be typically used. The prefabricated male and female slabs are each individually reinforced by metal rods which extend therethrough in both longitudinal and transverse directions and are interconnected along each side by a plurality of male and female connectors, which serve to reinforce the assembled slab system continuously in both the longitudinal and transverse directions.

The male type prefabricated concrete slabs have a series of spaced reinforcing rods which run through the slab in a first (longitudinal or X) direction parallel to two opposite sides of the slab and a second series of spaced rods of a similar construction running in a second (transverse or Y) direction perpendicular to the longitudinal direction and parallel to the two other opposite sides of the slab. These reinforcing rods protrude beyond the lateral edges on one to four sides of the slab for several inches, in the range of 5–10 inches depending on the size of the reinforcing rods required, and are fitted at the distal ends with a head or similar fixture which is wider than the diameter or width of the rod. The rods are made of steel or other material typically used as reinforcement for concrete slabs. The projecting rod end with the distal end or similar fixture extending beyond the sides of the male slabs serve as the male connector of the concrete slab connector system of the present invention.

The female type prefabricated concrete slabs have a plurality of female connector sockets or socket fixtures positioned on one to four sides of the female slab, each at a location to correspond to one of the male connectors of the male slab. The female connector sockets or socket fixtures are open on the top to allow the male connectors of a male slab to drop into the female connector sockets when the male slab is lowered into position alongside one or more female slabs. As such, with four adjacent female slabs, all of the male connectors on each side of the male slab project into corresponding female connector sockets on one side of the four adjacent female slabs.

The female socket fixtures at corresponding positions on opposite sides of the female slab are interconnected by at least one steel reinforcing rod, and preferably two, that extend the length and width of the female slab in both the longitudinal (X) direction and transverse (Y) direction. When the male and female slabs are assembled, with the male connectors properly positioned within their corresponding female connector sockets, the female sockets are then filled with high strength grout or other solidifying material to finish off the connection. When so assembled, the longitudinal and transverse reinforcing rods in conjunction with the male and female connectors provide continuous reinforcement between the male and female slabs in two directions, both longitudinally and transversely.

Where a female slab or a male slab is to be positioned at an open edge of the assembled slab system, i.e., with no corresponding male or female slab positioned adjacent the open edge, the projecting rod ends or female connector sockets, as the case may be, are preferably omitted along the open edge so as to provide a finished edge around the assembled slab system.

In a preferred embodiment of the present invention, the head or similar fixture fitted to the distal end of the metal rods projecting from the sides of the male slab is in the form of a large threaded nut which is threadedly engaged upon threads formed at the distal end of the metal rods. This threaded engagement between the nuts and distal ends allows for minor adjustment of the male connectors in the longitudinal direction so as to compensate for minor variations in the male connectors and the female sockets.

The female connector sockets or socket fixtures preferably have a "key hole" shape in both the horizontal (X and Y dimensions) and vertically along the side of the slab (the Z direction). The female sockets are preferably made of steel or other rigid material and cast into the desired shape. Starting from the female slab side edge, the female socket has an elongated slot at its top which opens up into a receiving cylinder or enlarged chamber for receiving the head or other fixture at the distal end of the male connector. In the vertical direction, the female socket has a similar slot opening to a wider section or cylindrical channel at the bottom. The enlarged chamber and channel are sized to provide dimensional tolerance to the male connector when positioned in the female connector socket to adjust for variations in the male connectors and the female sockets during manufacture of the precast male and female slabs.

The male and female slabs of the present invention can be manufactured utilizing forms of the type typically used to manufacture prefabricated concrete slabs. The reinforcing metal rods for the male slabs are positioned longitudinally and transversely (the X and Y directions) in the forms with the threaded ends and nuts thereon protruding at least the required distance beyond the designated side walls of the slab to be formed. The concrete or other cementitious material can then be poured into the form and the slab cast. The rod projections can be cut back to the prescribed length, if necessary. The nuts can be threaded on the rod ends before or after casting as desired.

The female slabs are formed in the same manner. Reinforcing rebar rods interconnecting oppositely facing sockets (or without sockets along one or more open side edges) are spaced longitudinally and transversely with the outer and upper surfaces of the female connector sockets positioned to be flush with the top surface and side edge of the female slab in the form. The concrete or other cementitious material is added to precast the slab with the female sockets positioned along the upper side edges of the slab. If desired, the male and female slabs can have a concave indentation midway in the sides around the periphery of the slabs.

Accordingly, it is an object of the present invention to provide a precast concrete slab connector system that allows two adjacent preformed concrete slabs to be connected together quickly and easily.

It is another object of the present invention to provide a concrete slab connector system that allows two connected precast concrete slabs to develop full tension reinforcement in two dimensions.

It is a further object of the present invention to provide a pre-fabricated concrete slab system wherein the precast concrete slabs have a male and female type and wherein the male and female slabs interconnect with each other in a checkerboard fashion.

It is yet another object of the present invention to provide a precast concrete slab system wherein male type pre-fabricated concrete slabs have a plurality of reinforcing rods which extend through the slabs, in both the X and Y directions, and protrude beyond the lateral edges on one to four sides of the slab. The rod projections are fitted at their distal ends with a head or similar fixture which is wider than the diameter or width of the rod or cable to form male connectors.

It is a still further object of the present invention to provide a precast concrete slab system wherein female type pre-fabricated concrete slabs have a plurality of connector sockets which are designed to allow the projecting male connectors to drop into the female connector sockets on one to four sides when a male slab is lowered and fitted adjacent one or more female slabs. The socket fixtures in the female slabs are connected to steel reinforcing rods that extend the length and width of the slab in the longitudinal and transverse directions to provide superior strength and develop full tension reinforcement between the male and female slabs in two dimensions.

Still another object of the present invention is to provide a method for assembling a precast concrete slab system wherein (1) at least one rectangular female concrete slabs, having a plurality of female socket fixtures spaced along one or more side edges interconnected with reinforcing elements extending longitudinally and transversely through the female slab, is positioned on a roadbed, (2) at least one rectangular male concrete slab, having a plurality of reinforcing elements extending longitudinally and transversely through the slab and projecting beyond one or more side edges to form spaced male connectors, is positioned adjacent a side edge of a female slab having the spaced female socket fixtures therealong such that the spaced male connectors are received in respective spaced female socket fixtures, and (3) each of the female socket fixtures having a respective male connector received therein is filled with a binder material which, when solidified, fixes the male connectors in the female socket fixtures and provides continuous reinforcement between the male slab reinforcing elements and the female slab reinforcing elements.

Yet another object of this invention to be specifically enumerated herein is to provide a precast concrete slab system in accordance with the preceding objects which will conform to conventional forms of manufacture, be of simple construction and easy to use so as to provide a precast concrete slab system that will be economically feasible, strong and long lasting and relatively trouble free in installation and use.

These together with other objects and advantages of this invention which will become subsequently apparent reside in the details of constructions and operations as more fully hereinafter described and claimed, reference being had to the accompanying drawings forming a part thereof, wherein like numerals refer to like parts throughout.

DETAILED DESCRIPTION AND PREFERRED EMBODIMENTS

Figure 1:
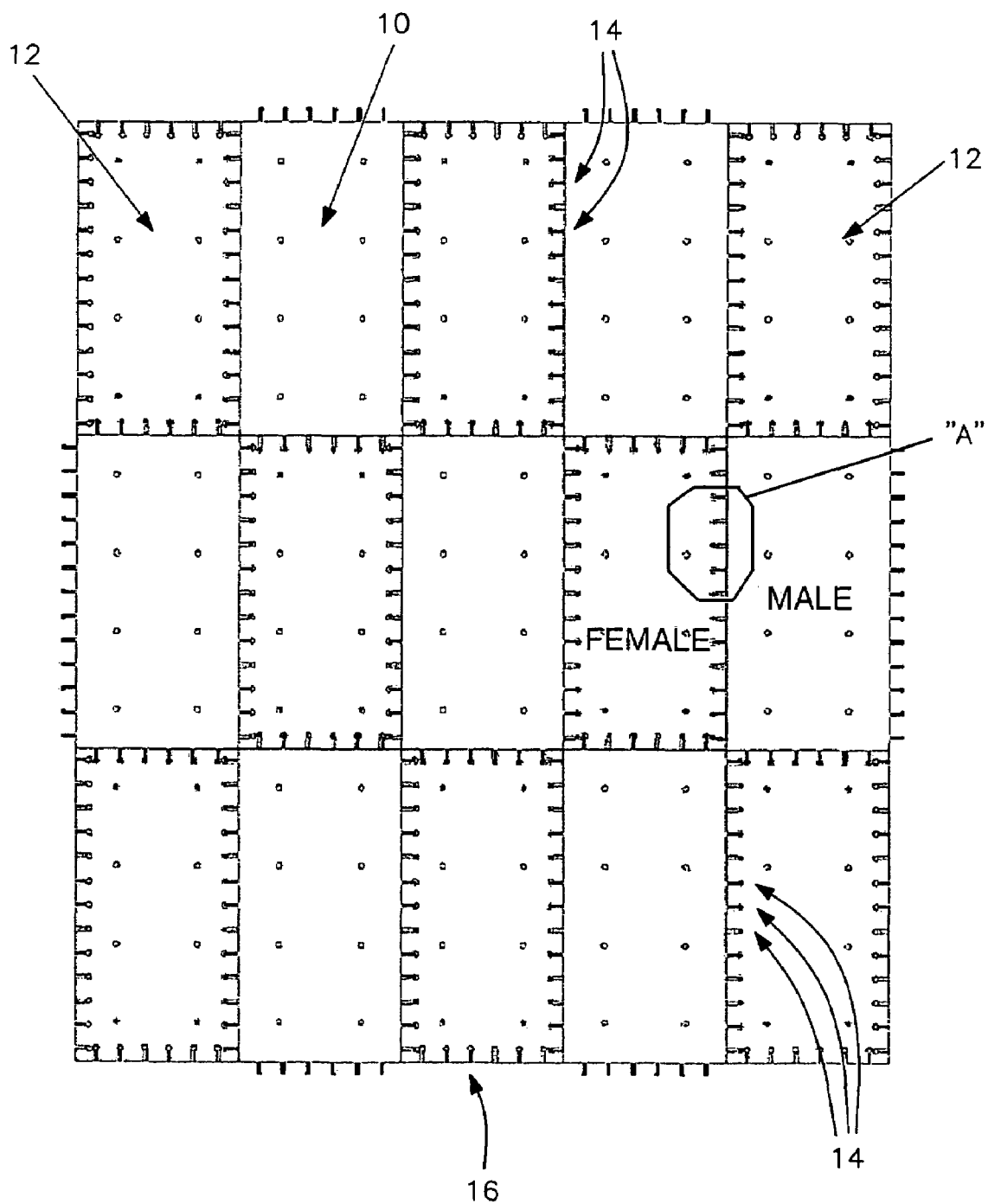
FIG. 1 shows a top plan view of an assembled section of a precast concrete slab system in accordance with the present invention.

Although preferred embodiments of the present invention are explained in detail, it is to be understood that other embodiments are possible. Accordingly, it is not intended that the invention is to be limited in its scope to the details of constructions and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose. Further, although the drawings are intended to illustrate the present invention, the drawings are not necessarily drawn to scale.

Referring to the drawings, FIG. 1 shows a plan view of rectangular male slabs, generally designated by reference numeral 10, and similarly sized rectangular female slabs, generally designated by reference numeral 12, in accordance with the present invention. Square slabs are contemplated in the broader term "rectangular." The male slabs 10 and female slabs 12 are interconnected to each other in a checkerboard fashion by connectors, generally designated by reference numeral 14, to form a roadway section or the like, generally designated by reference numeral 16.

The male slab 10 has a plurality of reinforcing rods 18 which extend horizontally through the slab in both the X (longitudinal) and Y (transverse) directions generally perpendicularly to each other. The rods 18 have projections 20 which extend outwardly a short distance, preferably about 5 inches to about 10 inches, from all four sides 22 of the male slab 10. Fitted to the distal end of each projection 20 is a lug or head 24 which is larger in cross-section than the diameter of the rods 18 (and projections 20) to form male connectors generally designated by reference numeral 26. In a preferred embodiment, the ends of projections 20 are threaded as at 28 (see FIG. 8) and the head or lug 24 is a correspondingly threaded nut 30 which can be adjusted lengthwise to accommodate tolerance variations, as described hereinafter.

The male slabs 10 are typically constructed by pouring a paving material such as concrete or other similarly used material into a rectangular form (not shown). The form has the reinforcing rods 18 properly positioned longitudinally and transversely therein and with the male connectors 26 extending beyond the form side edges.

Figure 6:
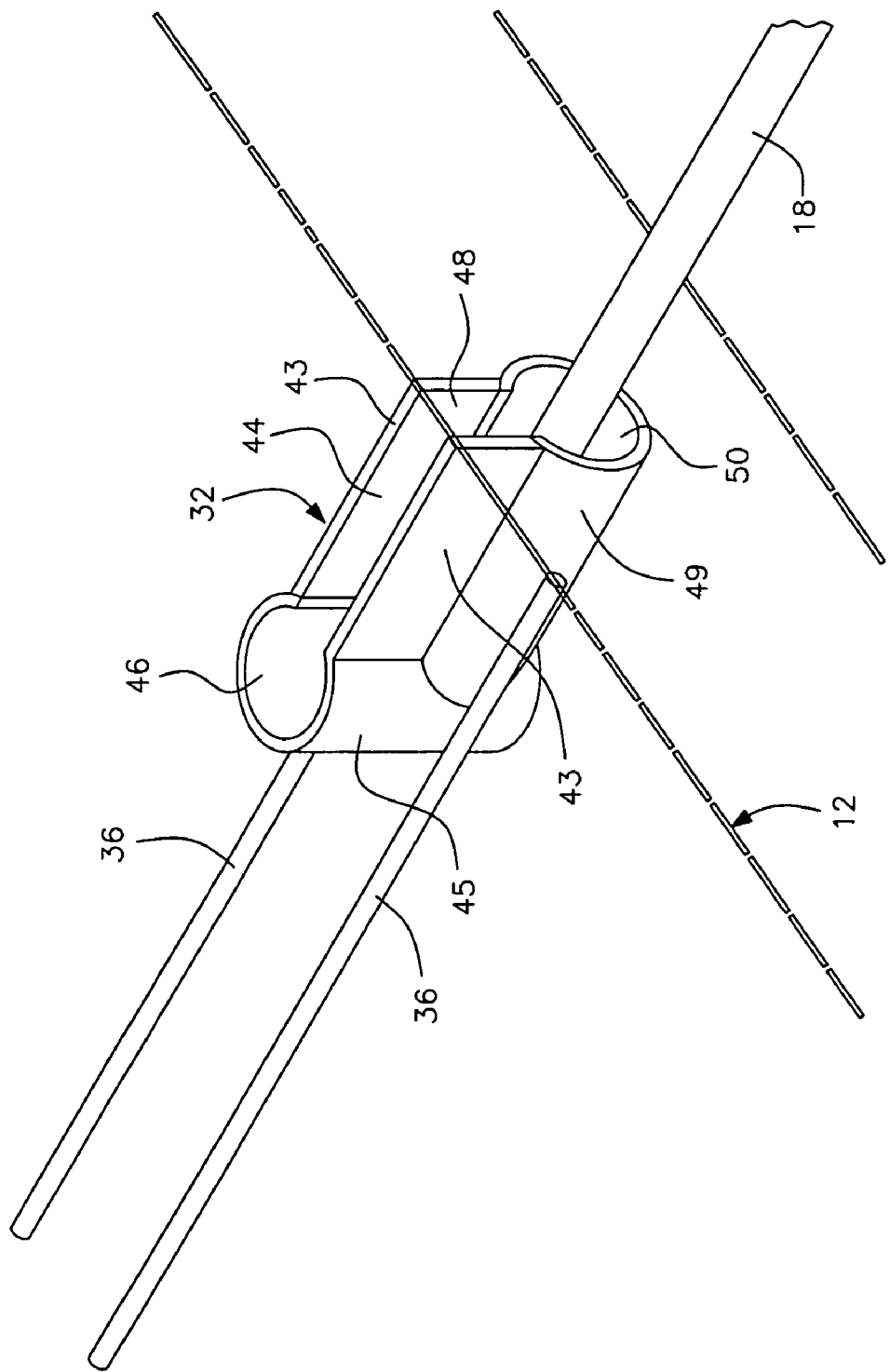
FIG. 6 shows a cut-away view of a female socket fixture in accordance with the present invention with the steel rebar for reinforcing the precast female slab and the end of the male rod extending into the female socket fixture.
Figure 7:
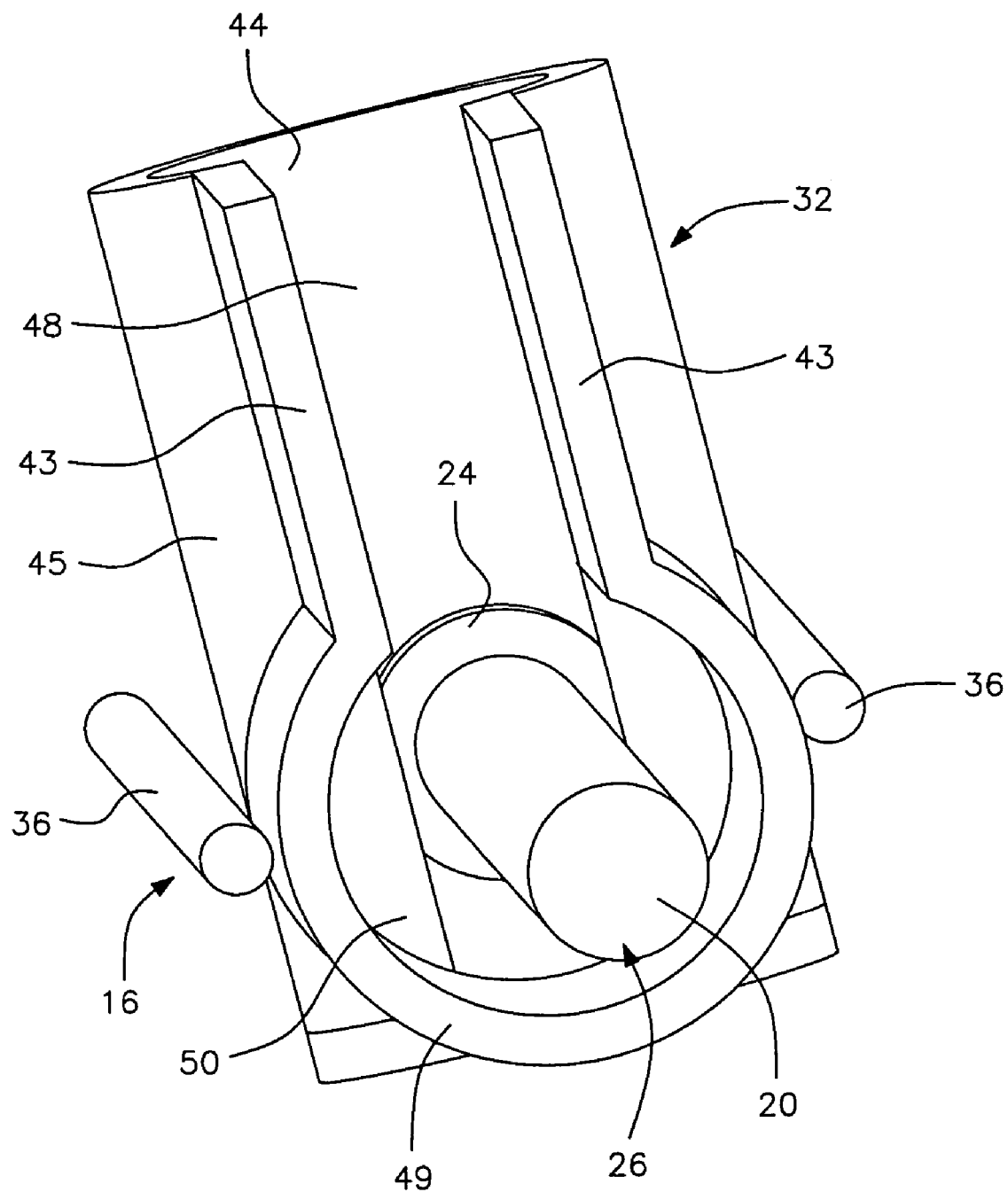
FIG. 7 shows a perspective front view of the female socket fixture and components shown in FIG. 6, as viewed looking into the socket from the side of the slab.

The female slab 12 is fitted with a plurality of female connector sockets or socket fixtures, generally designated by reference numeral 32, along each female slab side edge 34, both longitudinally and transversely, each of which is positioned to receive a corresponding male connector 26. Attached to each female socket 32 is one or more reinforcing rebar rods 36 which extend through the female slabs 12 in both the X and Y directions and attach to a corresponding female socket fixture 32 on the opposite sides of the slab 12. In a preferred embodiment a pair of rebars 36 are welded or otherwise attached along the side of each socket fixture 32, as shown in FIGS. 6 and 7.

The rods 18 of the male slabs 10 and the rebar 36 attached to the female sockets 32 are sized and spaced longitudinally and transversely, and the number of slab connectors 14 including the interconnecting male connectors 26 and female sockets 32 are selected, depending upon the design and strength characteristics for the assembled precast slab system. While steel rods are preferred for rods 18 of the male slabs 10 and rebar 36 of the female slabs 12, as typically used in reinforced precast concrete slabs, other elongated reinforcing elements could be used, perhaps with modification, such as stiff metal cables, metal straps or other elongated components typically used to reinforce concrete and the like.

The female slabs 12 are also constructed by pouring concrete or the like into a rectangular form which positions the female sockets 32 along the edges and the rebar 36 longitudinal and transversely through the slab 12. When used in the field, the female slab or slabs 12 are put in position first and then the male slabs 10 are dropped in adjacently in the checkerboard pattern as seen in FIG. 1.

Figure 2:
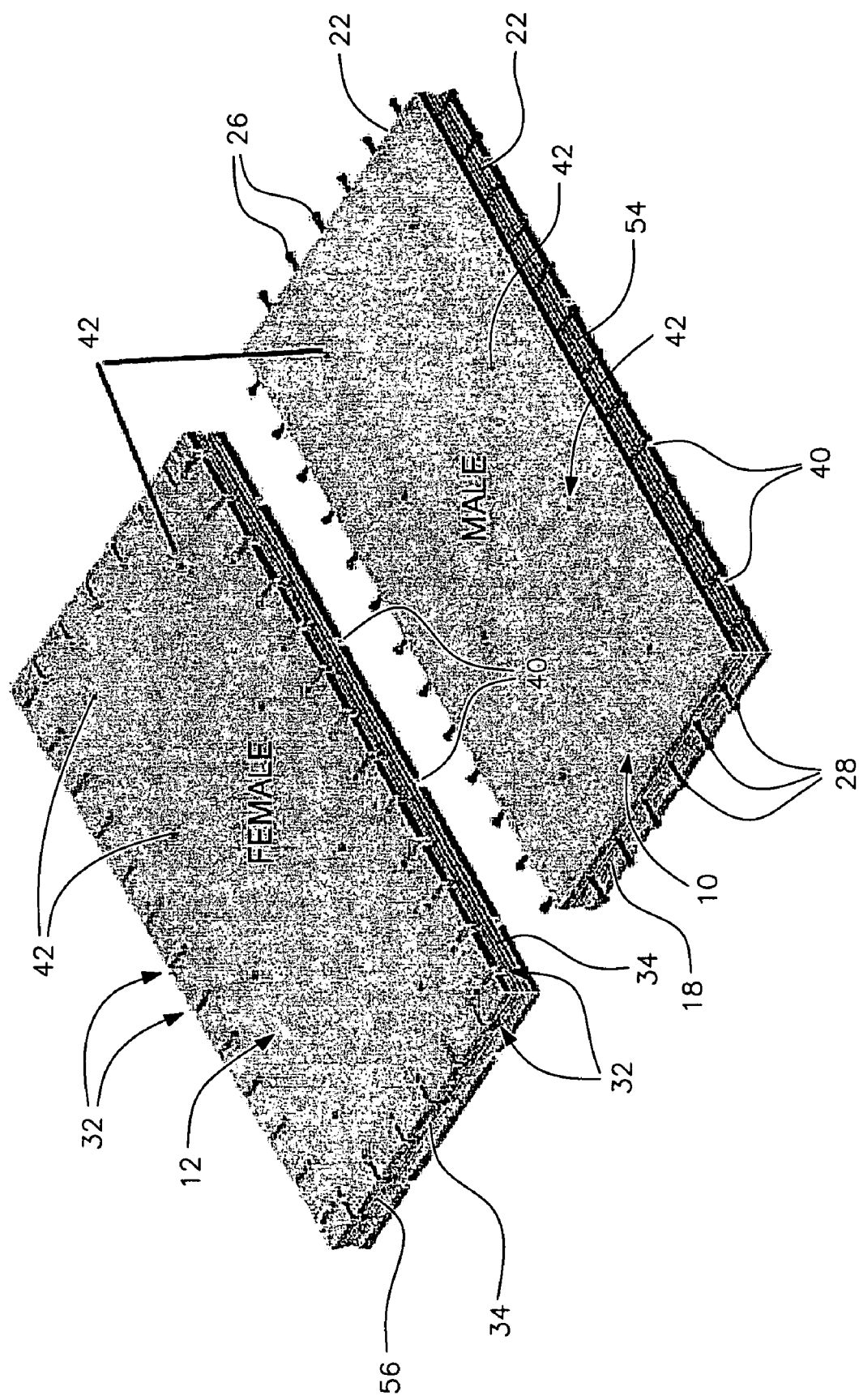
FIG. 2 shows a perspective top angle view of one male and one female slab in accordance with the present invention lying side-by-side, but spaced from each other.

FIG. 2 illustrates a male slab 10 with a plurality of male connectors 26 protruding from all four lateral sides 22 which are aligned with the plurality of female sockets 32 along all four lateral sides 34 of the female slab 12. When these slabs are laid on a subgrade for assembly, the bottom surface of the slabs will not be a perfect fit to the contour of the subgrade. In order to eliminate the areas formed by these irregularities in the subgrade or slab, the bottoms of the slabs 10 and 12 are provided with a series of grooves or channels 40 which extend the length of the slabs in both the longitudinal and transverse directions and intersect each other at various points to form a grid pattern (See FIG. 3). A grout hole 42 is formed on the top side of both the male slabs 10 and the female slabs 12 where the longitudinal and transverse channels 40 intersect on the bottom of the slabs for inserting grout or concrete or similar binder into the channels on the bottom side of the slabs. The grout or similar binder is pumped into the holes 42 in order to fill the grooves or channels 40 and the void areas between the underneath sides of the slabs 10 and 12 and the subgrade material.

Figure 4:
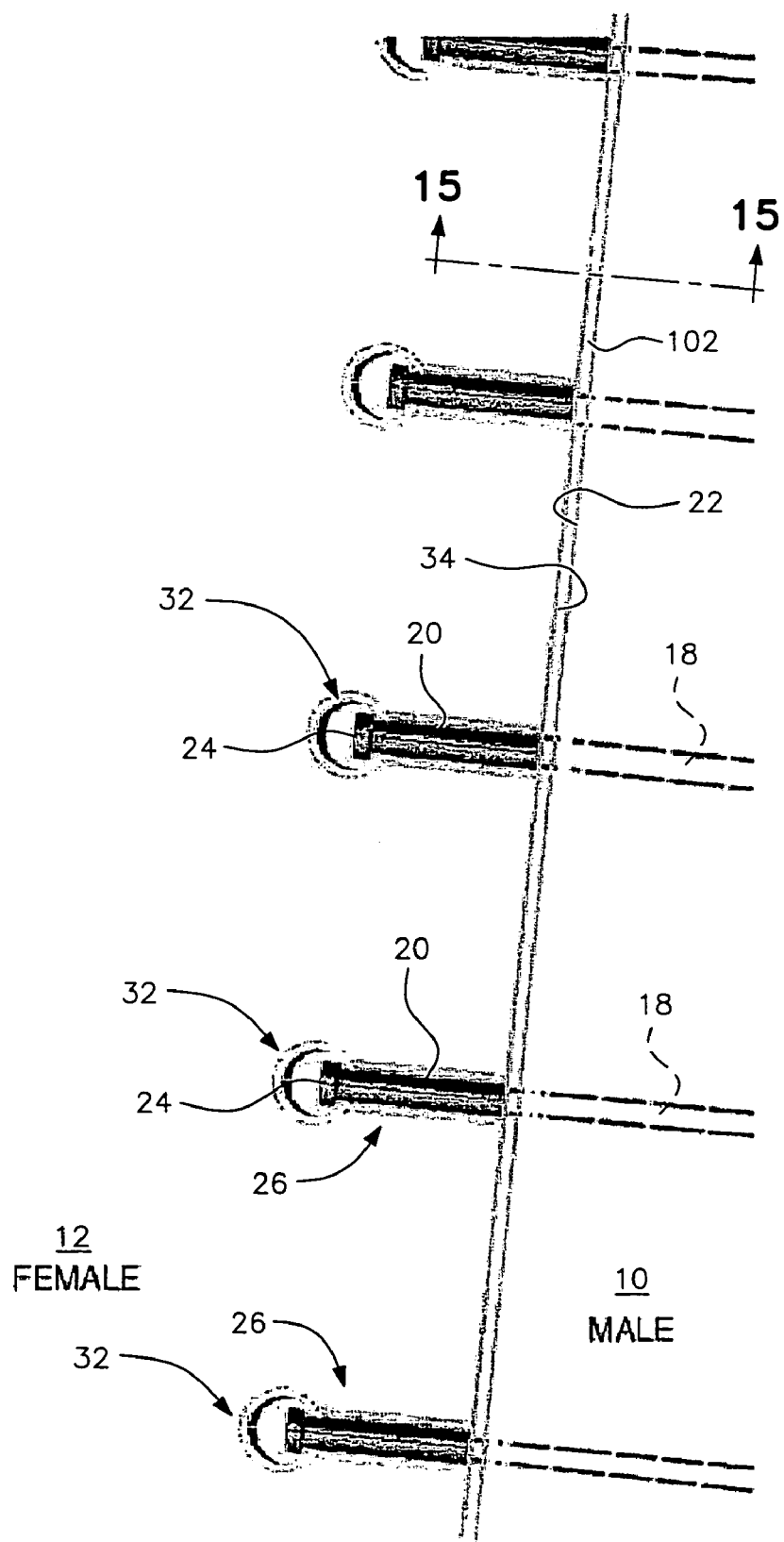
FIG. 4 shows a closer view of the attachment or connector system of the present invention between lateral edges of the male and female slabs when placed adjacent to each other in use.

FIG. 4 is a closer view of Detail "A" from FIG. 1. The male connectors 26 of the male slab 10 are shown aligned and fitted into place into the female sockets 32 of the adjacent female slab 12. In the embodiment depicted, the male connectors 26 include projections 20 with widened heads or lugs 24. After the male slab 10 is dropped in place, the connectors 26 are secured within the female sockets 32 by filing the sockets with high strength concrete mortar or similar material to secure the connector 26 permanently and rigidly in place.

Figure 5:
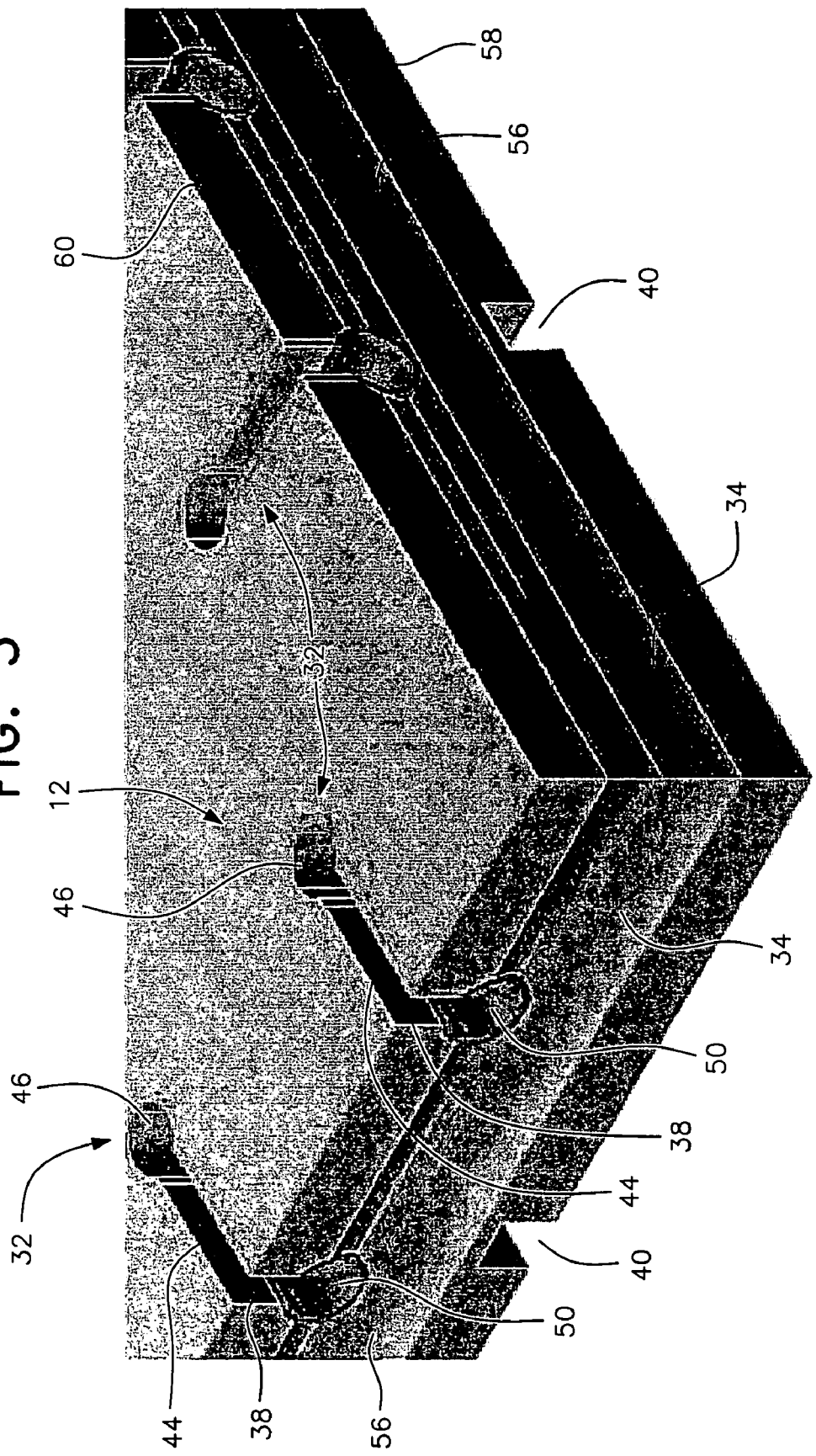
FIG. 5 shows a perspective detail view of the corner of a female slab in accordance with the present invention showing how the female connector sockets are placed along the edges of the slab and where the grooves on the slab underside meet the edges of the slab.

In FIG. 5, a corner detail view shows how the female sockets 32 are shaped and fit into the lateral side edges 34 of the female slab 12. The female sockets 32 are preferably formed or molded as one piece from a high strength material, such as steel or other durable metal or other suitable material, and placed into their proper positions in the female slab 12 by the form during the female slab's formation. The female sockets 32, in a preferred embodiment, have a three-dimensional "keyhole" shape. When viewed from the top, the female socket 32 has generally vertical side walls 43 which form a vertical slot 44 along its longitudinal axis, as one moves from the edge 34 of the slab toward the middle. The rear of the side walls 43 open into an enlarged cylindrical end wall 45 which defines a cylindrical chamber 46.

Figure 16:
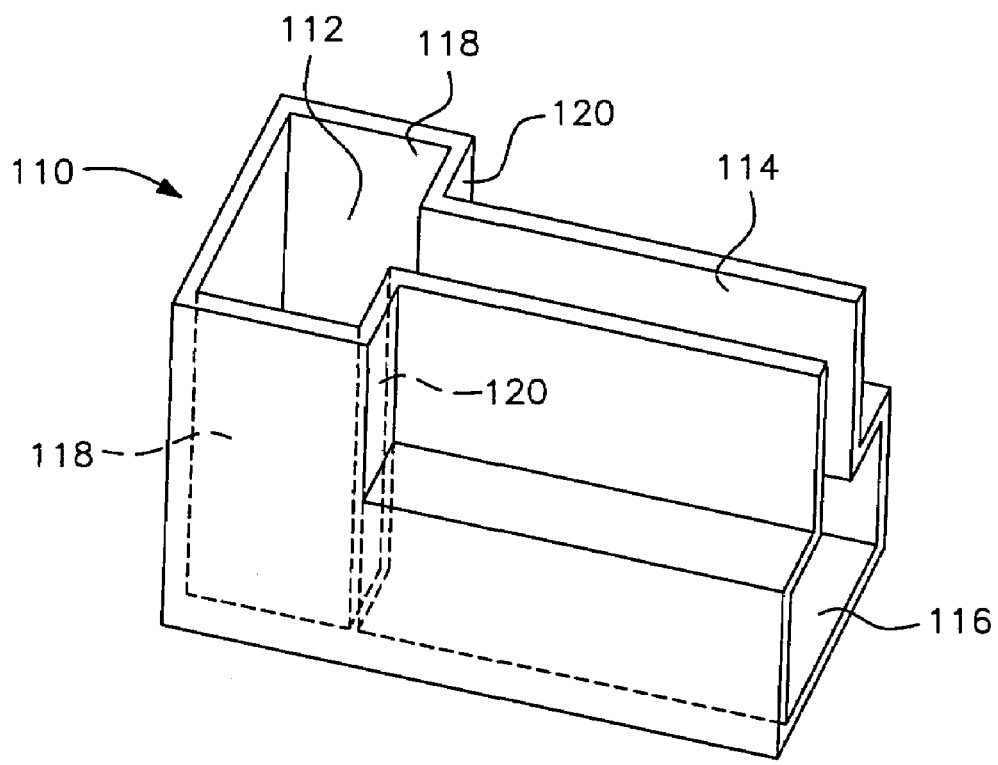
FIG. 16 is a perspective side view of an alternate female socket fixture.

In an alternate embodiment for the female socket 32, as shown in FIG. 16, the female socket is generally designated by reference numeral 110. The socket 110 has a rectangular shape such as a "T" shape where the chamber 112 at the head of the "T" is wider than the slot 114 so that the widened head or lug 24 of the male connector 26 can be lowered vertically into the "T" for receipt into the enlarged channel 116. The head 24 is then secured from being moved laterally in either direction by walls 118 or pulled horizontally out of the socket 110 by wall portions 120 on both sides of slot 114. Other shaped female sockets which allow the male connector 26 to be lowered vertically into the socket and which physically retain the male connector in the socket are also contemplated in accordance with this invention.

FIG. 6 shows a female socket 32 connectively pre-attached to the pair of steel reinforcing rebar or rods 36 on either side of the female socket and reinforcing rod 18 from the adjacent male slab 10 with male connector 26 in place in the socket 32. The steel reinforcing rods or rebars 36 are pre-welded or otherwise rigidly secured to the female socket 32 on both lateral sides before assembly into the molds to cast the concrete for the female slab 12. Socket fixtures 32 positioned along one shorter transverse side edge are pre-welded or otherwise securely connected to reinforcing rods 36 running in the longer longitudinal direction which then terminate at a socket fixture 32 correspondingly positioned on the opposite transverse side edge. Similarly, the socket fixtures 32 positioned along the longer longitudinal side edge are pre-welded or otherwise securely connected to reinforcing rods 36 running in the shorter transverse direction which then terminate at a corresponding socket fixture 32 on the opposite longitudinal side edge.

When the female socket 32 is viewed from the front, as in FIG. 7, the socket also preferably has a vertical "keyhole" shape. The vertical opening 48 at the front of side walls 43 defining slot 44 is straight as one moves from the top of the slab 12 to the bottom and opens into a cylindrical bottom 49 defining a circular channel or opening 50. This shape allows the male connectors 26 to be dropped in from the top side of the female slab 12 and limits the lateral or horizontal movement of the male connectors once in place in the female socket 32. The enlarged channel or opening 50 at the bottom of slot 44 provides tolerance in the event of minor irregularities in the positioning of the male connectors 26 along the side edges 22 of the male slab 10 and their corresponding female sockets 32 along the adjacent side edge 34 of the female slab 12.

Figure 3:
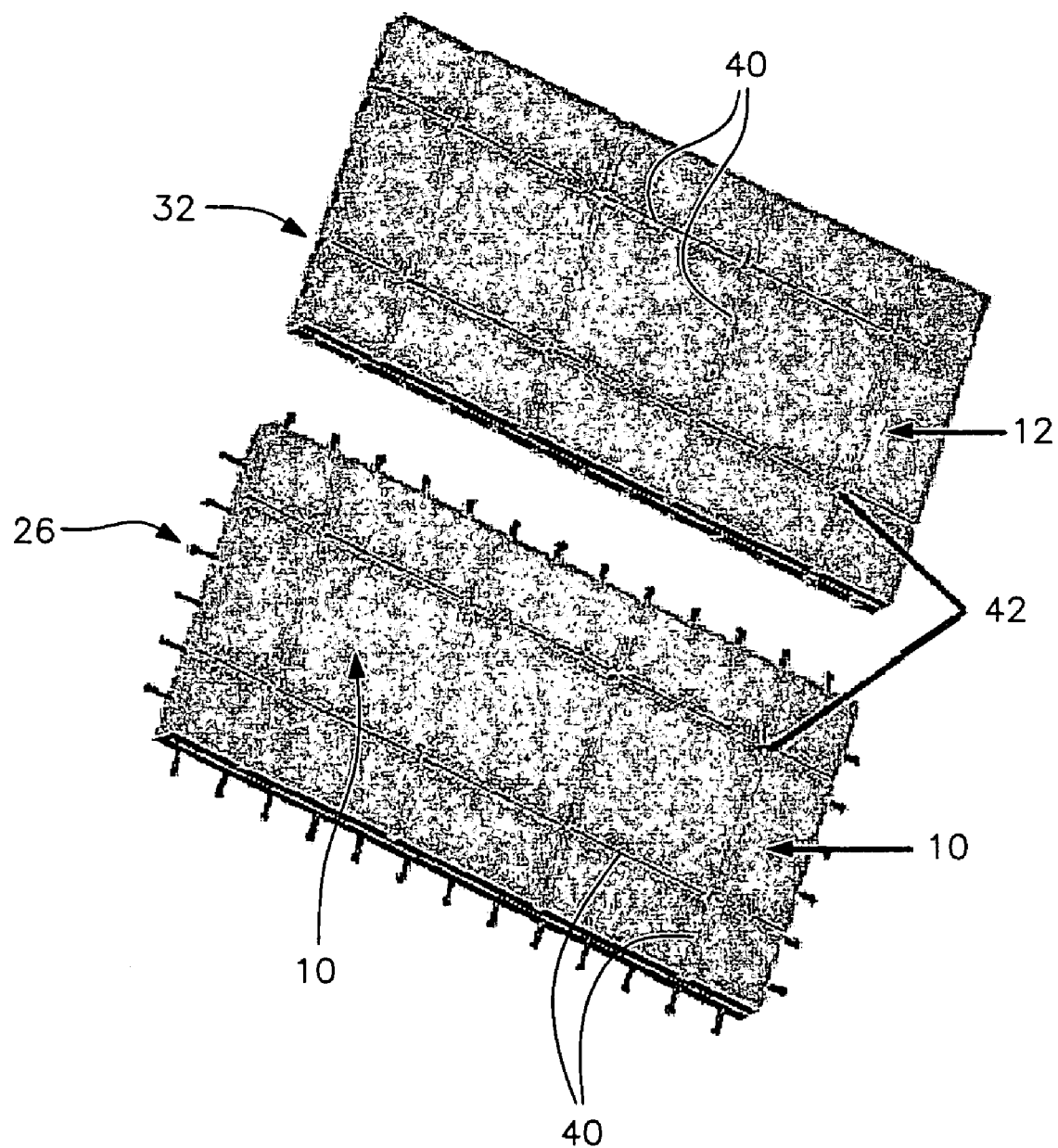
FIG. 3 shows a bottom view of one male and one female slab in accordance with the present invention similar to FIG. 2.

As stated above, both the male slabs 10 and female slabs 12 preferably include a plurality of channels 40, six as shown, two of which run longitudinally in the X direction of the slabs, and four of which run transversely in the Y direction. The channels 40 formed along the bottom surfaces of the slabs facilitate the even distribution of a bedding material, such as bedding grout or concrete, a polymer foam material, or other similar material, to the underside of the slabs. As shown in FIG. 3, the channels 40 include a grout hole 42 at each intersection of the longitudinal and transverse channels 40, thereby providing access to the channels 40 from the top surface of the slabs. The grout holes 42 permit injection of the bedding material beneath the bottom surface of the slabs from the top surface after the slabs have been installed in place.

Figure 15:
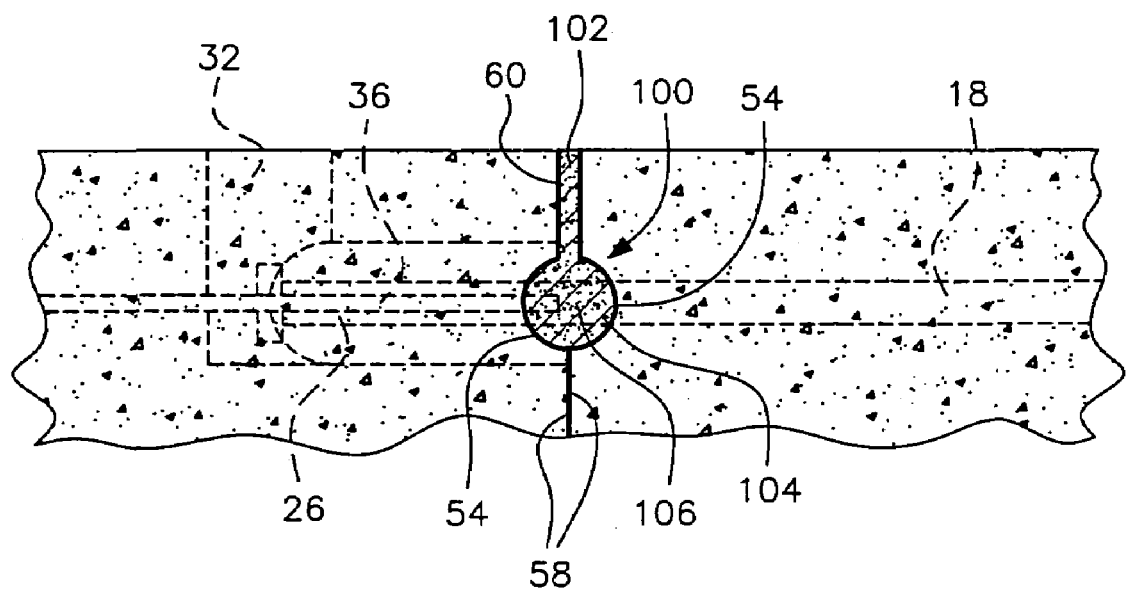
FIG. 15 shows a cross-sectional view taken along line 15—15 of FIG. 4, illustrating the keyway between adjacent male and female slabs which is filled with grout filler material in the assembled slab system.

As illustrated in FIG. 5, the channels 40 are preferably in the shape of rectangular voids. In alternative embodiments, the channels 40 may take other shapes, such as half-round voids, trapezoidal voids. Further, the side walls 22 of male slabs 10 and side walls 34 of female slabs 12 are shaped to form a keyway, generally designated by reference numeral 100, between adjacent side walls 22 and 34 (see FIG. 15). The keyway 100 is slotted at the top forming slot opening 102 which opens into central groove 104. The groove 104 is formed by facing horizontal concave cavities 54 approximately midway in the side walls (see also FIGS. 2 and 5). These cavities 54 leave upper and lower ledges 60 and 58, such as shown in FIGS. 5 and 15. The upper ledge 60 projects outwardly a lesser distance than lower ledge 58 so as to leave the space for slot opening 102 when ledges 58 of adjacent slabs are abutted. When the male slabs 10 and female slabs 12 are positioned adjacent each other in the concrete slab system of the present invention, the keyways 100 can then be filled with a binding material 106, such as early high-strength cement grout. When hardened, the binding material 106 in the keyways 100 serve to prevent adjacent male and female slabs from moving vertically with respect to each other.

Figure 8:
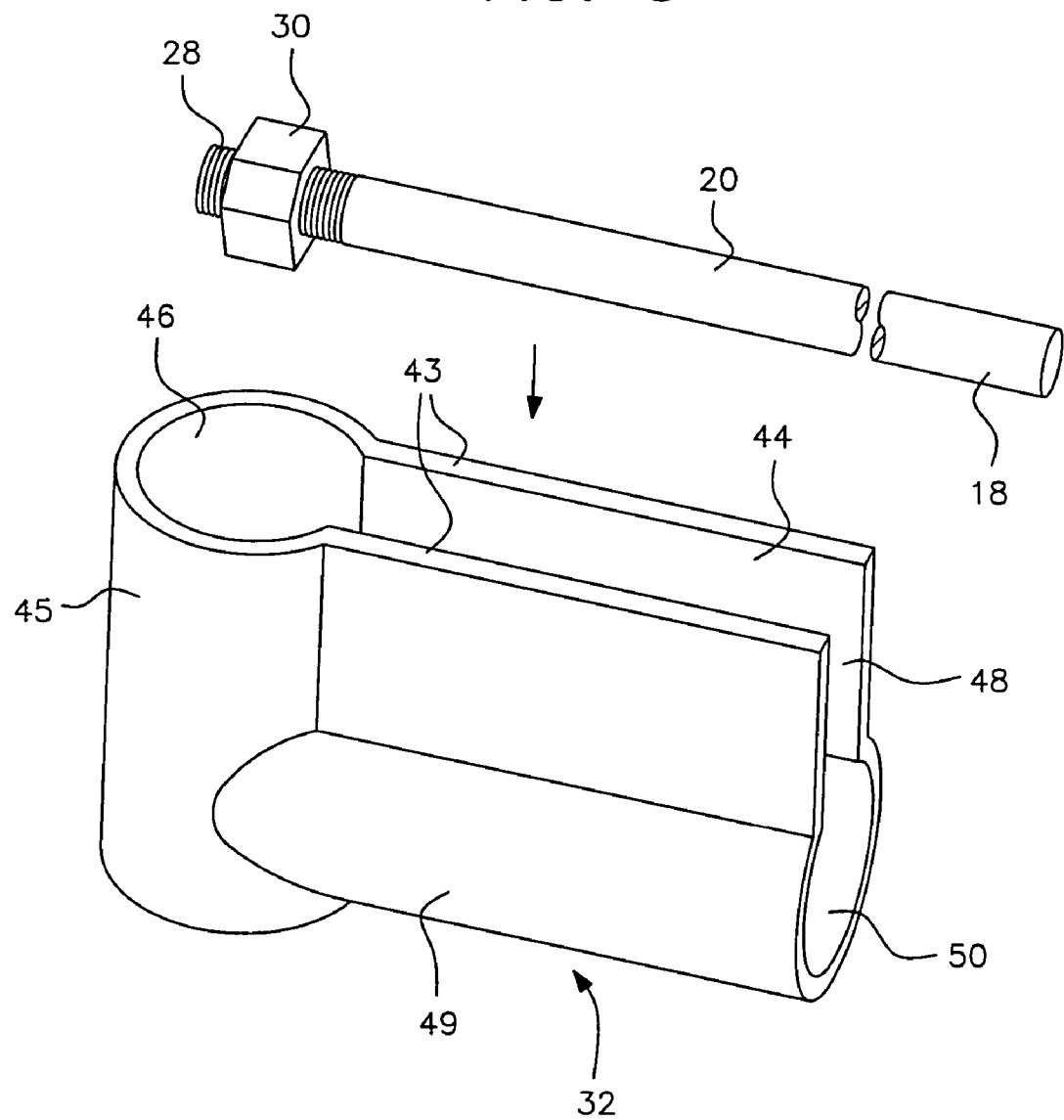
FIG. 8 shows an exploded partial perspective side view of the female socket fixture, with a preferred male connector positioned thereabove.
Figure 9:
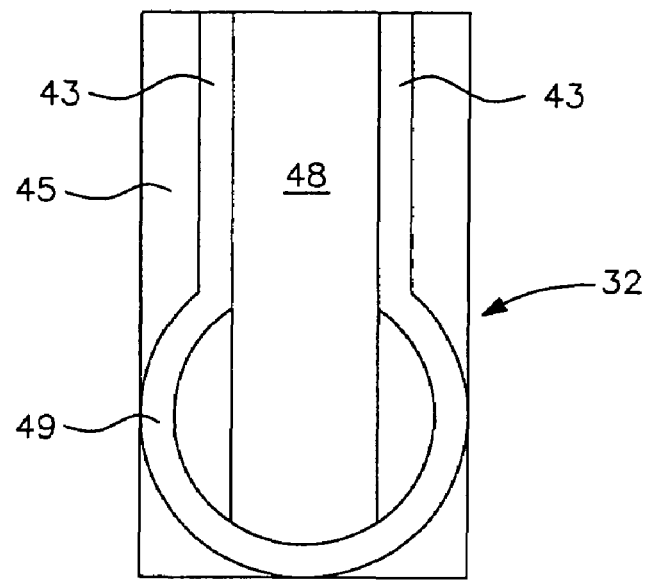
FIG. 9 shows a front view of the female socket fixture of FIGS. 6–8 by itself.
Figure 10:
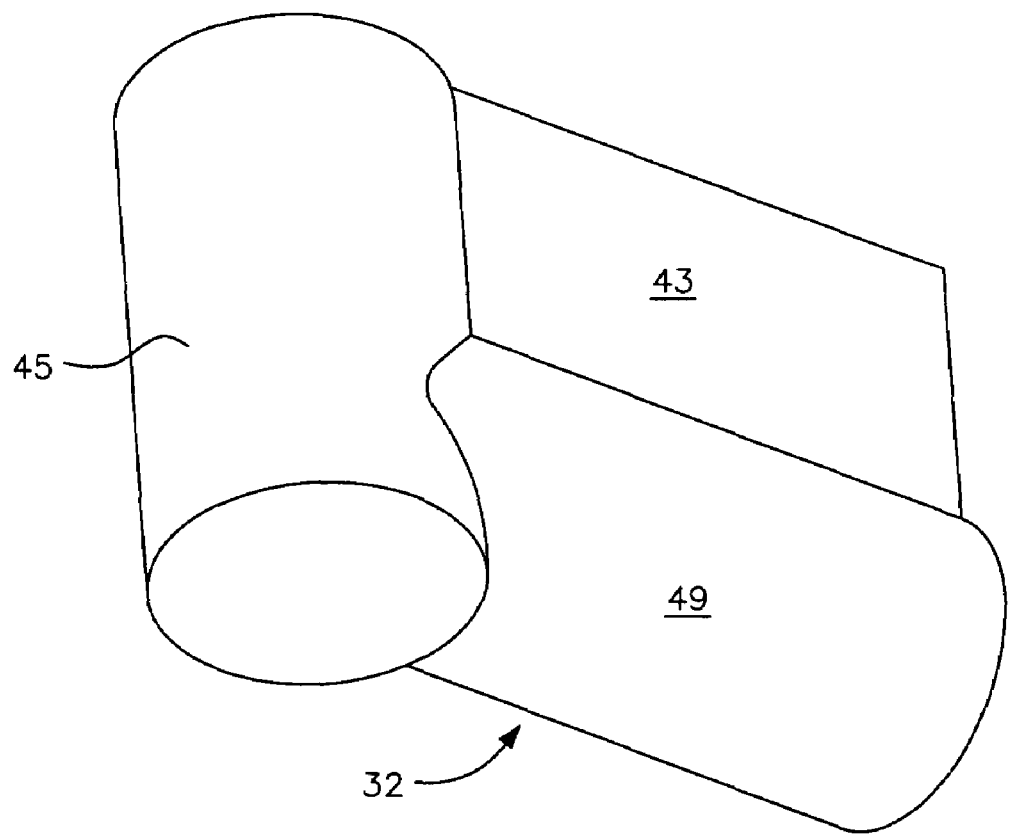
FIG. 10 shows a perspective bottom angle view of the female socket fixture of FIGS. 6–8 by itself.

The rods 18 of the male slab 10 are preferably made of steel reinforcing rods or other reinforcing material typically used to reinforce concrete and the like. In one embodiment, the ends or projections 20 are cut to the correct length and the ends hammered down or forged with the aid of heat to broaden or otherwise flatten the distal end to form the head 24 for the male connectors 26. The rods 18 are then placed in the form when the male slab 10 is created with the connectors 26 extending beyond the form the prescribed distance. As shown in FIG. 8, in a preferred embodiment, the projections 20 have threaded distal ends 28 on which are threaded large nuts 30 to form the enlarged head 20. The nuts 30 can be screwed onto the distal ends of the projections 20 before or after the male slab 10 is formed. With the nuts 30 forming the head 20 and threadedly received on the distal end of the projections 20, the nuts 30 (i.e. head 20) can be adjusted along the longitudinal axis of projections 20 to compensate for any minor misalignment between the nut 30 and its receipt within recess 46 of female socket 32.

Figure 11:
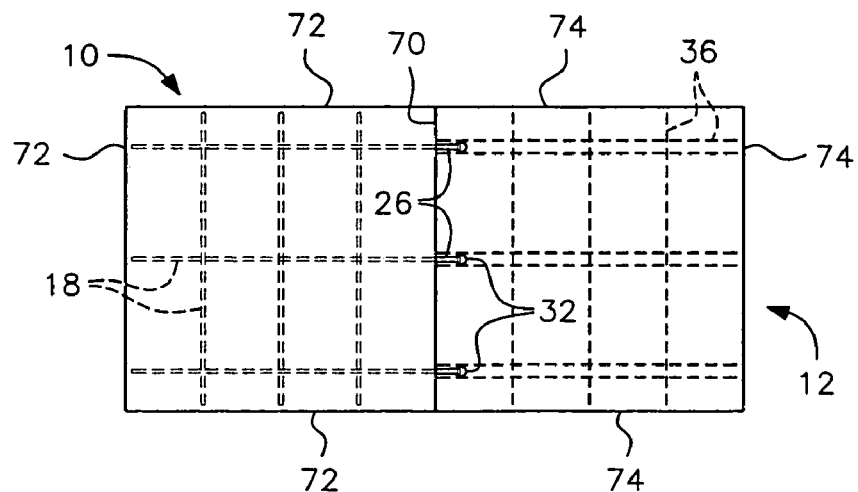
FIG. 11 shows a top plan view of an embodiment of a precast slab system utilizing a single male slab and a single female slab, in accordance with the present invention.

FIGS. 11–14 show top plan views of various embodiments of precast concrete slab systems in accordance with the present invention, showing the smooth finished open side edges along the outside of each slab system, without projecting rod ends 20 or female connector sockets 32 as the case may be, around the open sides. More specifically, FIG. 11 shows a pair of side-by-side male and female slabs 10 and 12, respectively, interconnected along adjacent edges 70 utilizing the male connectors 26 positioned within the female connector sockets 32, as previously described. The ends of reinforcing rods 18 of the-male slab 10 around the three open sides 72 do not include projections 20 and terminate short of the side edges 72, as shown. Similarly, the rebar 36 of female slab 12 around the three open side edges 74 also do not include female connector sockets 32 and terminate short of the open side edges 74. Also, as shown in FIG. 11, the longitudinal rebars 36 (in the X direction), may only be a single rebar strand, rather than the pair of rebar strands 36 in the transverse or Y direction.

Figure 12:
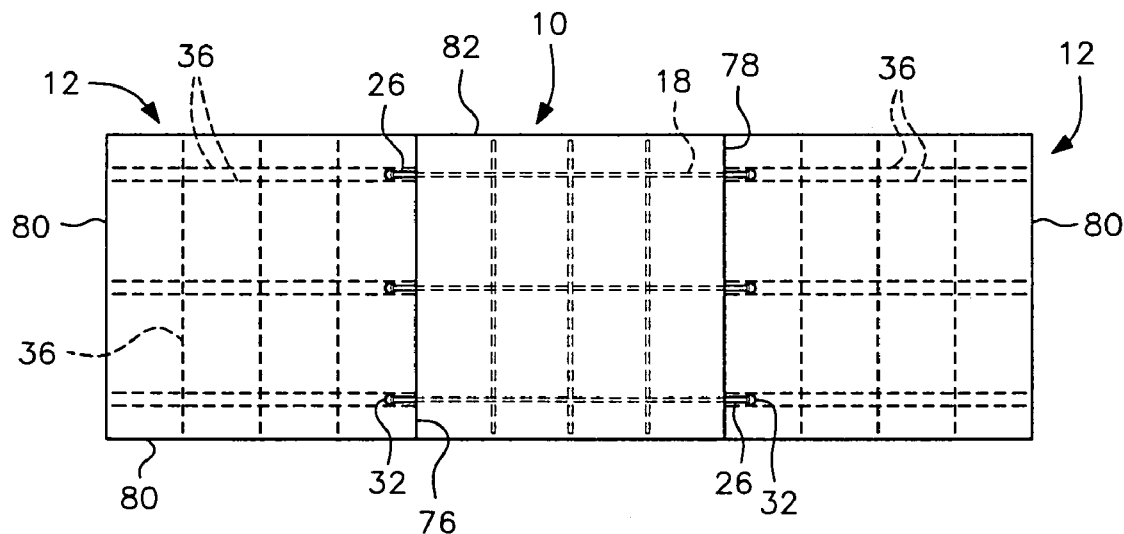
FIG. 12 shows a top plan view of another embodiment of a precast concrete slab system utilizing a single male slab and a pair of female slabs, one on each side of the male slab, in accordance with the present invention.

FIG. 12 shows a male slab sandwiched in between a pair of female slabs interconnected along side edges 76 and 78 by the male connectors 26 positioned within the female connector sockets 32, as previously described, such that the horizontal rebar 36 of the female slabs 12 and the horizontal rods 18 of the male slab 10 provide continuous reinforcement in the horizontal direction through all three interconnected slabs. The open three sides 80 of the two female slabs 12 and the open two sides 82 of the male slab 10 do not include the female connector sockets 32 or the male connectors 26, respectively, and the embedded rebar 36 and rods 18 terminate short of the open side walls 80 and 82, respectively. Only single rebar strands 36 are needed in the longitudinal (X) direction since sockets 32 are omitted on the open sides.

Figure 13:
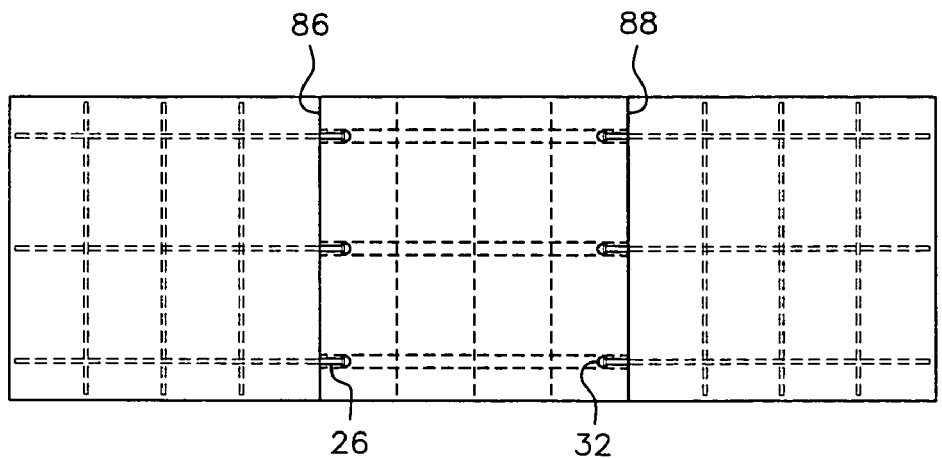
FIG. 13 shows a top plan view of a further embodiment of a precast concrete slab system utilizing a single female slab and a pair of male slabs, one on each side of the female slab, in accordance with the present invention.

FIG. 13 shows a slab system similar to FIG. 12 except one female slab 12 is sandwiched in between a pair of male slabs 10 which are interconnected along their adjacent side edges 86 and 88 by male connectors 26 positioned within the female connector sockets 32 as previously described.

Figure 14:
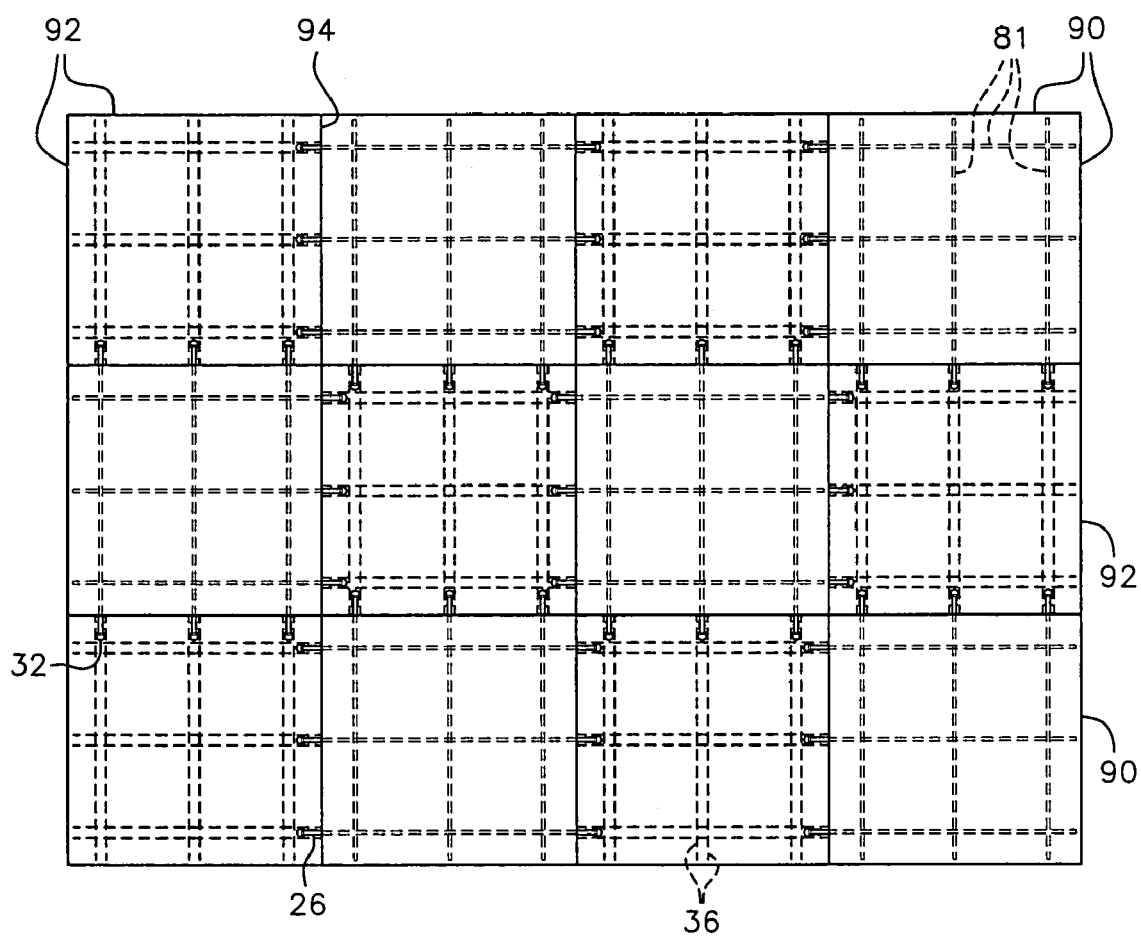
FIG. 14 shows a top plan view of yet another embodiment of a precast concrete slab system having multiple male and female slabs assembled in a checkerboard pattern with the open edges omitting the projecting rod ends or female connector sockets, as the case may be, to provide a finished edge along the assembled slab system, in accordance with the present invention.

Turning now to FIG. 14, six male slabs 10 and six female slabs 12 are shown assembled into a checkerboard slab system, with open male slab sides 90 and open female slab sides 92, in the same manner as previously described. The side edges of the male slabs 10 adjacent a side edge of a female slab 12 are interconnected along their adjacent side edges, such as side edge 94, by male connectors 26 positioned within female connector sockets 32, as previously described. Around the open side edges 90 and 92, the respective male connectors 26 and female connector sockets 32 are omitted and the rods 18 and rebar 36 embedded in the respective male and female slabs terminate short of the open sides 90 and 92. As described above and shown in FIGS. 11–14, the number of side edges with projecting male connectors 26 and female connector sockets 32 will depend on the number of adjacent side edges requiring reinforcing continuity between corresponding adjacent male and female slabs.

For installation, the male slabs 10 and female slabs 12 are placed within the replacement area such that the female slabs 12 contact the subbase uniformly so as not to disrupt the subbase or damage the female slabs 12. During placement, each male slab 10 is lowered vertically to the exact location required to match the existing adjacent female slabs 12. Care is taken to insure that the male connectors 26 of the male slab 10, along the longitudinal and transverse sides of the male slab 10, are lowered over the female sockets 32 along the longitudinal and transverse sides of the adjacent female slabs 12, respectively. As the male slab 10 is lowered vertically, care must be taken to ensure that the male connectors 26 are set within their respective female sockets 32 of the adjacent existing female slabs 12.

After the male slabs 10 are placed in position adjacent to the female slabs 12, and all of the male connectors 26 are properly positioned within their corresponding female sockets 32, the spaces formed by the channels 40 on the bottom surface of the male slabs 10 and female slabs 12 are then injected from the top surface of the slabs through the grout holes 42 with binder material, such as grout including cement, water and fly ash, or in the alternative with a polymer foam material. The binder material is injected into the channels 40 to ensure that all voids existing between the bottom surfaces of the male slabs 10 and female slabs 12 and the subbase (not shown), regardless of size, are filled. The slabs should be monitored during injection of the binder material to ensure they are not vertically displaced due to the upward pressure created thereunder.

The female sockets 32 are then filled from the top surface of the slabs with a binder material such as early high-strength cement grout, thereby rigidly fastening each male connector 26 within its corresponding female socket 32. Following the filling of the female sockets 32, or simultaneously therewith, the keyways 100 are also filled with a binder material 106, such as early high-strength cement grout, by pouring the binder material through slot opening 102 until the central groove 104 and slot opening 102 are filled. When hardened and solidified, the binder material 106 rigidifies the spacial relationship between adjacent slabs, particularly against any relative vertical movement between the adjacent slabs. It is desirable for the binder material in both the female sockets 32 and the keyways 100 to reach sufficient strength to transfer load from one slab to the other before opening the slabs to traffic.

In a preferred embodiment, high early strength grout is used in order to fill the channels 40 and voids underneath the male slabs 10 and female slabs 12, as well as the socket fixtures 32 and keyways 100. This type grout allows the slabs to be in service within the shortest period of time. Preparation of the subbase and placing of the slabs can take place around the clock as this type of work may be done with the aid of flood lighting and thus repairs can be completed in the shortest period of time.

When assembled, and with the male connectors 26 fixed in place in female sockets 32 by the high strength grout or the like, the present invention provides a precast concrete slab system in which reinforcing steel rods or other elongated reinforcement can extend continuously both longitudinally (the X direction) and transversely (the Y direction) throughout the slab system. More specifically, starting with the rods 18 of the male slabs 10, the rods 18 terminate in projections 20 forming male connectors 26 which fit into corresponding female sockets 32. The sockets 32 are, in turn, attached to rebars 36 which extend through the female slab 12 and are rigidly attached to a corresponding female socket 32 on the opposite side of the female slab 32. The female socket 32 on the opposite side of the slab 12 receives the male connector 26 of the next male slab 10 which projects from a reinforcing rod 18 of the next male slab 10. This progression is repeated throughout the slab system to provide, continuous reinforcement throughout in both the longitudinal and transverse directions.

Without intending to be limiting, the male and female slabs 10 and 12 in accordance with the present invention can be as small as 4 feet by 4 feet square, or 4 feet by 8 feet rectangular, and as large as 25 feet by 25 feet square and 20 feet by 40 feet rectangular. The reinforcing rods 18 for the male slabs 10 are typically round with approximately a 1 inch diameter. Preferably, these 1 inch round rods are placed apart between about 2 to about 3 feet on center. In order to provide similar strength characteristics for the female slab 12, utilizing a pair of round rebar rods 36 for each female socket 32, the rods 36 would typically be about ¾ inch in diameter. Obviously, the female sockets 32 would be spaced apart in the female slabs 12 the same distance as the rods 18 in the male slabs 10. As would be readily understood by those skilled in the art, the size of the slabs 10 and 12, the spacing of the rods 18 and sockets 32, and the sizing and material of the reinforcing rods 18 and 36 can be varied by the design and intended use of the slab system in accordance with the present invention.

Typical dimensions for the female connector socket or socket fixture 32 would be as follows. The length of the fixture along its major axis could be about 200 mm and a vertical height of about 128 mm. The slot 44 could be about 33 mm wide, while the enlarged chamber 46 and channel 50 could have a diameter of about 73 mm. In this size socket, the male connectors 26 would most preferably extend about 7–8 inches from the side of the male slab 10.

The connectors 14 and continuous reinforcement system of the present invention, including the male connectors 26 and female socket fixtures 32 have the potential for use in other precast concrete structures which rely on interconnection between repeating precast components. Hence, it is not intended to limit the potential usages of the connection system of the present invention. For example, the connection system might be used to fasten lengths of concrete pipe or conduit.

Figure 17:
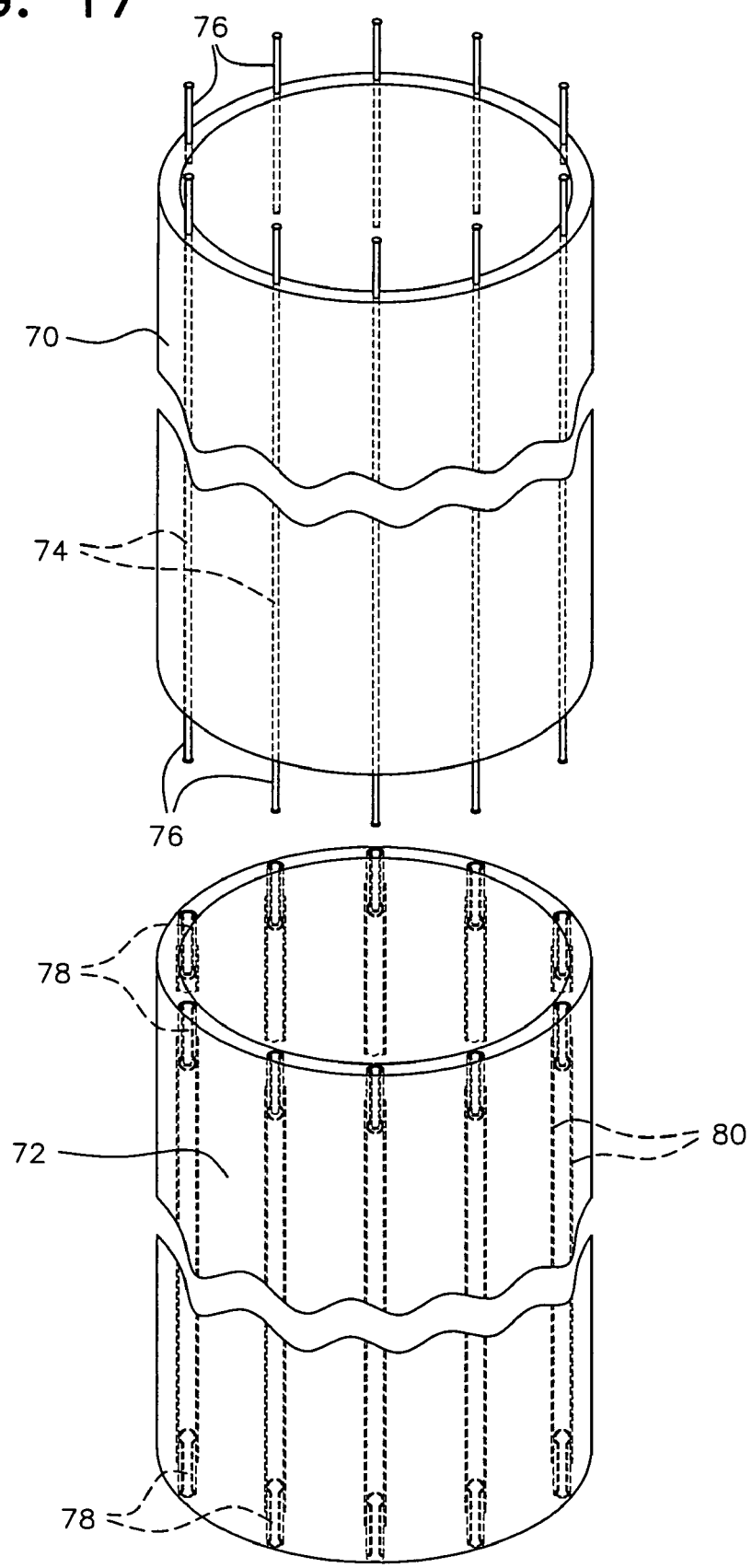
FIG. 17 shows a plan view of another embodiment incorporating the connector system of the present invention for a concrete pipe or conduit.

FIG. 17 shows a contemplated embodiment of this application illustrating two pipe sections, one male section 70 and one female section 72. It is contemplated that each male pipe section 70 would have a plurality of reinforcing rods 74 extending therethrough. Each reinforcing rod 74 would have projections extending beyond both ends of the pipe section to form a series of male connectors 76 projecting beyond both ends of the pipe section. Each female section 72 would have a series of socket fixtures 78, similar to female sockets 32, correspondingly positioned on each end to receive a male connector 76 therein. The open top of each socket fixture 78 would lie along the outer edge surface of the female section 72. Corresponding female sockets 78 on each end of the female pipe section 72 would be interconnected by a pair of reinforcing rebar rods 80 in the same manner as slabs 12.

In operation, the male connectors 76 would be of the threaded embodiment (shown in FIG. 8) and during installation would have no nuts 30 on the ends until after the two pipe sections were fitted together with the male projections inserted into the female sockets 78. After fitting, the nuts 30 would be threaded onto the projections to form the male connectors 76, and the sockets 78 then filled with grout to complete and rigidify the interconnection. The connection system of the present invention would thus form continuous reinforcement throughout the longitudinal extent of the concrete pipe or conduit.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within. the scope of the invention.

The invention claimed is:

1. A male and female connector system for interconnecting reinforcing elements embedded in a pair of mating concrete structures, each of said concrete structures having an upper surface and a side edge, said connector system comprising a reinforcing element in one of said mating concrete structures having an end projecting beyond the side edge of said one mating concrete structure with an enlarged head thereon to form a male connector, and a female socket fixture connected to a reinforcing element in said other concrete structure and positioned along the side edge of said other concrete structure for receiving said male connector through a top of said female socket fixture which is open to said upper surface.

2. The male and female connector system of claim 1, wherein said female socket fixture includes an enlarged chamber open to said upper surface for receiving said male connector enlarged head as lowered therein in a generally vertical direction.

3. The male and female connector system of claim 2, wherein said reinforcing element projecting end is threaded and said enlarged head thereon is a threaded nut threadedly received on said projecting end.

4. The male and female connector system of claim 2, wherein said open top of said female socket fixture is in the general shape of a keyhole with an elongated first slot extending from said other concrete structure side edge to said open enlarged chamber, said first slot being open to said upper surface, and said chamber being open to said other concrete structure side edge via said slot, a width of said first slot being less than a width of said enlarged head.

5. The male and female connector system of claim 1 wherein said female socket fixture also has a generally keyhole shaped opening with a second slot along the side edge of said other concrete structure, said second slot opening into a bottom channel for receiving said projecting end when the enlarged head of said male connector is received in said female socket fixture enlarged chamber.

6. The male and female connector system of claim 1 wherein said reinforcing elements are steel reinforcing rods.

7. The male and female connector system of claim 4 wherein said keyhole shape is defined by the first slot having a generally rectangular top open to said upper surface and said enlarged chamber being generally cylindrical with a generally circular top open to said upper surface.

8. The male and female connector system of claim 4 wherein said keyhole shape is defined by the first slot having a generally rectangular top open to said upper surface and said enlarged chamber having a generally rectangular top open to said upper surface.

9. The male and female connector system of claim 8 wherein said generally rectangular top of said first slot has a length extending generally parallel with said male connector projecting end and said generally rectangular top of said enlarged chamber has a length oriented to be substantially perpendicular to said first slot length.

10. The male and female connector system of claim 5 wherein said keyhole shape is defined by the first slot having a generally rectangular top open to said upper surface and said enlarged chamber being generally cylindrical with a generally circular top open to said upper surface, said bottom channel being generally cylindrical and extending generally perpendicularly to said generally cylindrical enlarged chamber and having a generally circular end open to said side edge, and said second slot having a generally rectangular side open to said side edge.

11. The male and female connector system of claim 10 wherein a width of said bottom channel is greater than a width of said first and second slots.

12. The male and female connector system of claim 5 wherein said keyhole shape is defined by the first slot having a generally rectangular top open to said upper surface and said enlarged chamber having a generally rectangular top open to said upper surface, said bottom channel being generally rectangular and extending generally perpendicularly to said enlarged chamber and having a generally rectangular end open to said side edge, and said second slot having a generally rectangular side open to said side edge.

13. The male and female connector system of claim 12 wherein a width of said bottom channel is greater than a width of said first and second slots.

14. A male and female connector system for interconnecting reinforcing elements embedded in first and second mating concrete structures, each of said first and second concrete structures having a generally planar upper surface and a side edge substantially perpendicular to said upper surface, said connector system comprising:
   a reinforcing element embedded in the first concrete structure and having an end projecting beyond the side edge thereof with an enlarged head to form a male connector;
   a reinforcing element embedded in the second concrete structure and connected to a female socket fixture positioned along the side edge of said second concrete structure, said female socket fixture having a top which is open to said upper surface of said second concrete structure for receiving said male connector as lowered through said open top in a generally vertical direction and having an enlarged chamber open to said upper surface for receiving said male connector enlarged head.

15. The male and female connector system of claim 14, wherein said reinforcing element projecting end is threaded and said enlarged head thereon is a threaded nut threadedly received on said projecting end.

16. The male and female connector system of claim 14, wherein said open top of said female socket fixture is in the general shape of a keyhole with an elongated first slot extending from said second concrete structure side edge to said open enlarged chamber, said first slot being open to said upper surface, and said chamber being open to said second concrete structure side edge via said first slot.

17. The male and female connector system of claim 16, wherein a width of said first slot is less than a width of said enlarged head.

18. The male and female connector system of claim 16 wherein said female socket fixture also has a generally keyhole shaped opening with a second slot along said side edge of said second concrete structure, said second slot opening into a bottom channel for receiving said projecting end when the enlarged head of said male connector is received in said female socket fixture enlarged chamber.

19. The male and female connector system of claim 18 wherein a width of said elongated head is greater than a width of said first and second slots.

20. The male and female connector system of claim 18 wherein said keyhole shape is defined by the first slot having a generally rectangular top open to said upper surface and said enlarged chamber being generally cylindrical with a generally circular top open to said upper surface, said bottom channel being generally cylindrical and extending generally perpendicularly to said generally cylindrical enlarged chamber and having a generally circular end open to said side edge, and said second slot having a generally rectangular side open to said side edge.

21. The male and female connector system of claim 20 wherein a width of said elongated head is greater than a width of said first and second slots.

22. The male and female connector system of claim 21 wherein a width of said bottom channel is greater than a width of said first and second slots.

23. The male and female connector system of claim 18 wherein said keyhole shape is defined by the first slot having a generally rectangular top open to said upper surface and said enlarged chamber having a generally rectangular top open to said upper surface, said bottom channel being generally rectangular and extending generally perpendicularly to said enlarged chamber and having a generally rectangular end open to said side edge, and said second slot having a generally rectangular side open to said side edge.

24. The male and female connector system of claim 23 wherein a width of said bottom channel is greater than a width of said first and second slots.

\* \* \* \* \*